(12) United States Patent
Neil

(10) Patent No.: US 10,160,054 B2
(45) Date of Patent: Dec. 25, 2018

(54) INSTANTANEOUS GAS PURGE APPARATUS

(71) Applicant: Senior IP GmbH, Schaffhausen (CH)

(72) Inventor: Pete Edward Neil, Canyon Country, CA (US)

(73) Assignee: Senior IP GmbH, Schaffhausen (CH)

( * ) Notice: Subject to any disclaimer, the term of this patent is extended or adjusted under 35 U.S.C. 154(b) by 680 days.

(21) Appl. No.: 14/643,963

(22) Filed: Mar. 10, 2015

(65) Prior Publication Data

US 2016/0263693 A1    Sep. 15, 2016

(51) Int. Cl.
*B23K 9/16*    (2006.01)
*B23K 9/32*    (2006.01)
*B23P 19/04*    (2006.01)

(52) U.S. Cl.
CPC .............. *B23K 9/164* (2013.01); *B23K 9/325* (2013.01); *B23K 9/326* (2013.01); *B23P 19/04* (2013.01)

(58) Field of Classification Search
CPC ...... B23K 9/164; B23K 9/0061; B23K 9/186; B23K 11/062; B23K 9/0253; B23K 9/173; B23K 11/28; B23K 9/325; B23K 9/326; B23K 9/327; B23P 19/04
USPC ............. 228/42, 50, 56.5, 57, 219, 48, 44.5; 219/59.1, 60 R, 61, 72, 74, 90, 60 A
See application file for complete search history.

(56) References Cited

U.S. PATENT DOCUMENTS

| | | | | |
|---|---|---|---|---|
| 3,095,844 A | * | 7/1963 | Thielsch | B23K 9/325 137/561 R |
| 3,338,499 A | * | 8/1967 | Gilbert | B23K 9/325 138/89 |
| 3,521,020 A | | 7/1970 | Fielder et al. | |
| 4,101,067 A | * | 7/1978 | Sloan | B23K 31/027 219/136 |
| 4,415,114 A | * | 11/1983 | Hallenbeck | B23K 9/326 228/219 |
| 4,875,615 A | * | 10/1989 | Savard | B23K 9/325 138/89 |
| 5,187,343 A | * | 2/1993 | Edwards | B23K 9/325 138/90 |

(Continued)

FOREIGN PATENT DOCUMENTS

| | | |
|---|---|---|
| AU | 2008202719 B2 | 1/2009 |
| CN | 201848640 U | 6/2011 |

(Continued)

OTHER PUBLICATIONS

ISR issued on PCT/IB2016/051123, completed Jun. 24 2016, 4 pages.

(Continued)

*Primary Examiner* — Jimmy Chou

(74) *Attorney, Agent, or Firm* — Greenberg Traurig, LLP

(57) ABSTRACT

An instantaneous gas purge apparatus distributes a flow of a gas, such as an inert gas, directly juxtaposed to a welding seam between two adjacent tubes. The device includes a central hub having radially extending stabilizer arms, mounted inside one of the tubes to be welded. A counterweight and a gas dispersion unit are independently rotatable relative to the hub. The welding operation comprises a continuous rotation of the tubes. Using a stationary welding device, the gravitational pull on the counterweight maintains the gas dispersion unit proximate the welding seam.

31 Claims, 7 Drawing Sheets

(56) References Cited

U.S. PATENT DOCUMENTS

| | | | | |
|---|---|---|---|---|
| 5,484,973 A | * | 1/1996 | Gittens | B23K 9/162 219/61 |
| 5,535,938 A | * | 7/1996 | Leduc | B23K 37/0531 228/212 |
| 5,669,547 A | * | 9/1997 | Spring | B23K 9/164 228/219 |
| 5,711,474 A | | 1/1998 | Hummel | |
| 5,796,069 A | * | 8/1998 | Jones | B23K 9/0282 219/121.64 |
| 6,044,769 A | * | 4/2000 | Oka | F16L 55/179 104/138.2 |
| 6,070,784 A | * | 6/2000 | Holt | B23K 20/126 228/112.1 |
| 6,637,640 B1 | * | 10/2003 | Sennett | B23K 9/325 228/17 |
| 6,662,994 B2 | * | 12/2003 | Jankus | B23B 31/4066 228/44.5 |
| 7,011,244 B2 | * | 3/2006 | Baylot | B23K 37/0533 228/114 |
| 7,246,736 B2 | * | 7/2007 | Wang | B23K 1/203 219/125.11 |
| 8,136,715 B2 | * | 3/2012 | Nunnery | B23K 37/0531 228/212 |
| 8,207,468 B2 | * | 6/2012 | Choi | B23K 9/167 219/59.1 |
| 8,616,432 B1 | * | 12/2013 | Hacikyan | B23K 9/0061 138/89 |
| 9,296,060 B2 | * | 3/2016 | Hacikyan | B23K 9/325 |
| 9,586,284 B2 | * | 3/2017 | Evans | |
| 2003/0127493 A1 | * | 7/2003 | Ciriza | B23K 9/0282 228/42 |
| 2009/0050613 A1 | * | 2/2009 | Prasek | B23K 9/32 219/130.1 |
| 2010/0230953 A1 | * | 9/2010 | Baylot | F16L 9/18 285/120.1 |
| 2014/0117068 A1 | * | 5/2014 | Hacikyan | B23K 9/326 228/57 |
| 2014/0326779 A1 | * | 11/2014 | Hacikyan | B23K 9/326 228/42 |
| 2015/0174683 A1 | * | 6/2015 | Archibald, Jr. | B23K 9/326 228/219 |
| 2016/0074955 A1 | * | 3/2016 | Evans | B23K 9/326 228/219 |

FOREIGN PATENT DOCUMENTS

| | | |
|---|---|---|
| CN | 201940754 U | 8/2011 |
| CN | 102632331 A | 8/2012 |
| CN | 203236141 U | 10/2013 |
| EP | 0787058 B1 | 8/2003 |
| GB | 1121071 A | 7/1968 |
| GB | 1121071 A1 | 7/1968 |
| WO | 9006205 A1 | 6/1990 |

OTHER PUBLICATIONS

Written Opinion of the International Searching Authority on PCT/IB2016/05123, dated Jun. 24, 2016, 4 pages.
International Preliminary Report on Patentability and Written Opinion of the ISA on PCT/IB2016/051123, dated Sep. 12, 2017, 5 pages.

* cited by examiner

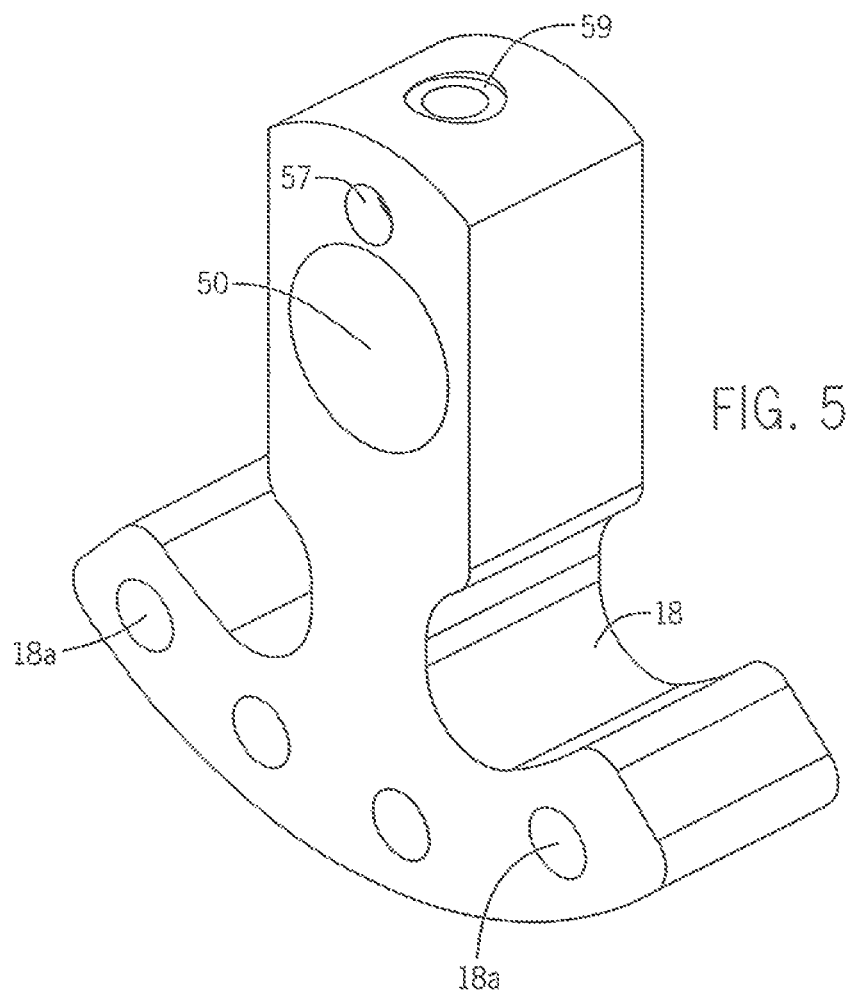
FIG. 5
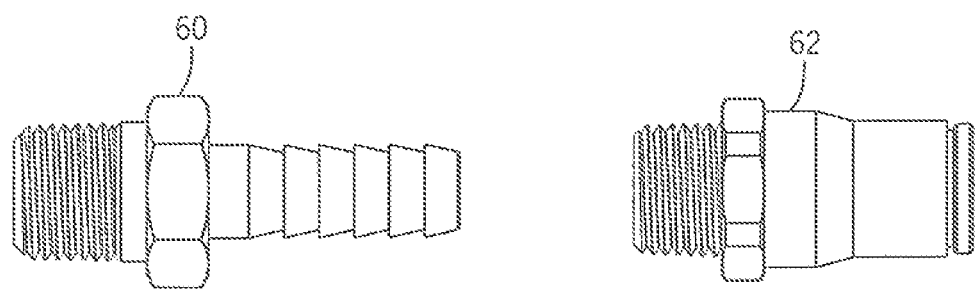
FIG. 8
FIG. 9

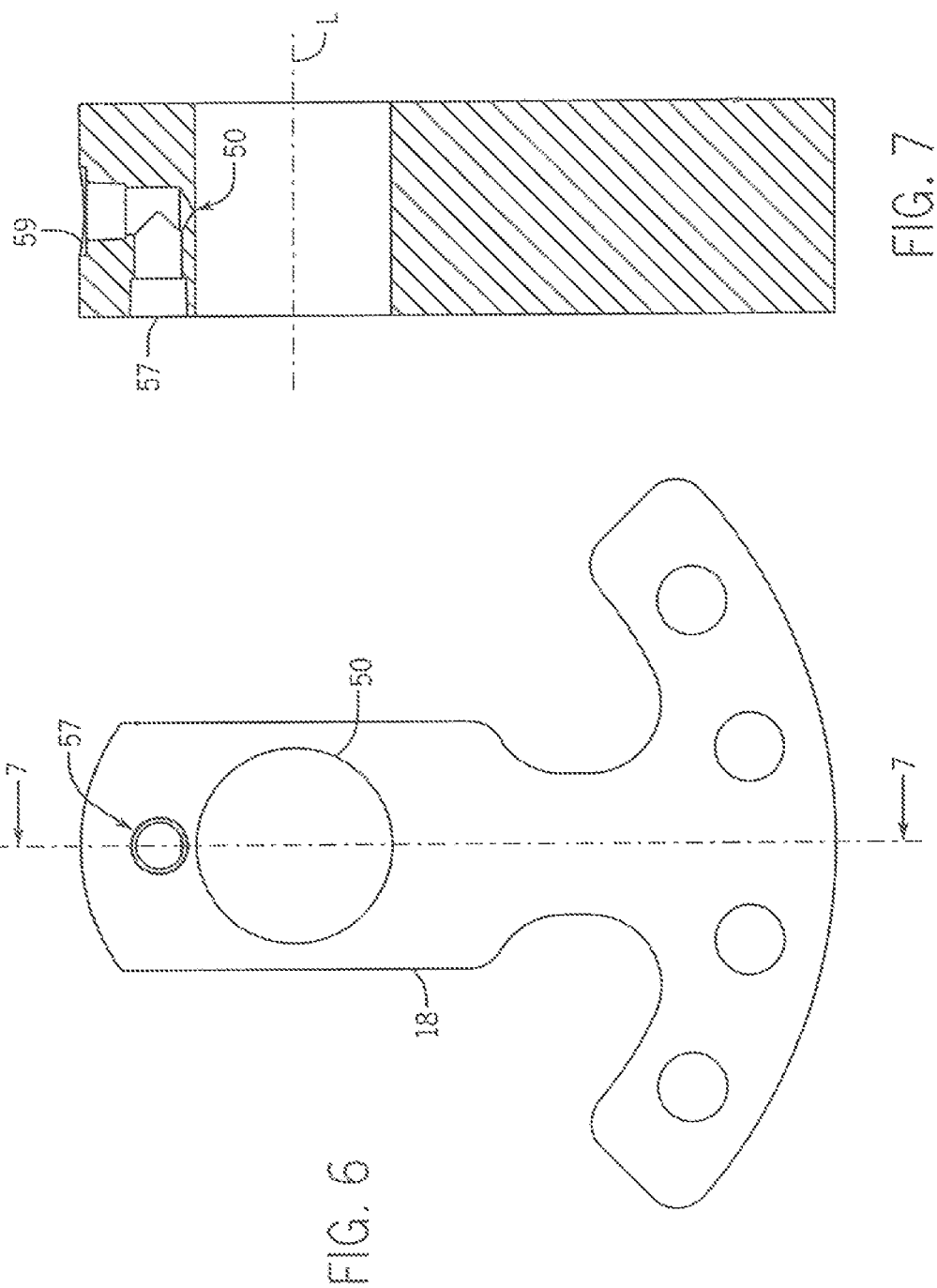

INSTANTANEOUS GAS PURGE APPARATUS

FIELD OF THE DISCLOSURE

The present invention relates generally to dynamic welding operations, including circular and cylindrical workpiece welding operations, and more particularly to an instantaneous gas purge device for such welding operations.

BACKGROUND OF RELATED ART

In certain welding operations, it is often necessary or desirable to remove or replace oxygen from a welding location to prevent oxidation of the weld as welding occurs. Oxidation of the weld can affect the integrity of the weld, and makes it more difficult to ensure that a given weld is defect free. Historically, this problem has been solved by using welding machines that incorporate large chambers surrounding the weld application site. In operation, any air and gas in those chambers is purged with an inert gas (such as argon), such that the chamber is filled with only the inert gas. Then, the welding can occur in a pure inert gas atmosphere, preventing any oxidation of the weld. Of course, a substantial drawback of this solution is that it requires significant amounts of expensive inert gases—together with a significant amount of equipment, preparation, evacuation time and/or effort. Likewise, where welding operations encircle a workpiece, requiring the purging of oxygen in the immediate welding region, the use of specialized inert gas conduit equipment, with gas-tight bearing sections may be required.

For instance, European Pat. No. EP 0787058 describes a device for use in joining pipes in a butt-welded joint. The described device may be utilized for shutting off one of two pipes or cylindrical sections to be joined by welding, and by supplying purge gas. The purge gas is distributed through evenly distributed radial nozzles into a gap of limited radial depth, so that the purge gas flows laminarly or quasi-laminarly past the welding line. The composition of the purge gas is sensed at the free end of the gas sampler or sensor located well downstream of the welding site. Additionally, set-up times for use of the device can be considerable.

U.S. Pat. No. 3,521,020, meanwhile describes another device for butt welding tubes. The described gas purge assembly is inserted into the interior of a work piece, which prevents oxidation of the interior of the weld. The assembly, however, distributes inert gas around the full 360 degree interior of the pipe to be welded, including vast regions well-distanced from the immediate weld site—to waste appreciable amounts of the inert gas being used. Likewise, set-up and turnaround times for use of the assembly can be substantial.

Still further, International Publication No. WO 90/06205 describes a method and tool for welding pipes. As described, in order to ensure the necessary gas coverage when welding stainless steel such as pipes, a method and apparatus are employed which comprises a rear gas apparatus provided with copper jaws which are provided with outlet openings for gas and coolant pipes which cool the welding zone and the gas. The welding apparatus can be provided with gas coverage in the form of a casing which is supplied with gas, and which is also provided with a coolant pipe for the cooling of the welding zone and the gas. Set-up and turnaround times with this method and tool can be excessive.

U.S. Pat. No. 5,711,474 similarly describes a method and apparatus for welding tubular members. In particular, the apparatus includes an array of gripping members 62, which are adapted to grippingly contact the inner surface of pipes to be welded together. Each of the gripping members 62 includes gas passageways, which are formed to exit through an outlet which is positioned to cause the existing gas to travel in a somewhat annular helical path within a valley. The pipes to be welded together are placed over the exterior of the tool and a localized purge gas source distributes inert gas around the full 360 degree interior of the pipe to be welded, displacing oxygen immediate not only the weld, but also elsewhere. Further, considerable set-up and turnaround times can be required.

Still further, US Patent Publication No. 2003/0127493 describes a gas purge welding ring, for placement within pipes to be welded. The described gas purge tool, however, is merely a ring having an adjustable circumference. Specifically, side walls of the ring extend to the inner surface of the pipe being welded, thereby creating an isolation zone, which is filled with inert gas. Still, the welding ring may require significant set-up and turnaround times.

Finally, Chinese Patent Publication No. 201940754 describes a gas purge tool disposed within a pipe to be welded, including a semi-automatic welding argon filling device. The welding device for two butt-welded alloy tubes includes an argon gas filling device flexibly arranged in the alloy tube, wherein the argon gas filling device is composed of a motor and rotatable telescoping swing arm on a motor housing. Three telescoping stabilizers extend from the motor housing. The telescopic swing arm is arranged on the mechanical output end of the motor, an argon filling box is fixed on the outer end of the telescopic swing arm, and an argon spray outlet is arranged on the top of the argon filling box opposite to the inner arm of the alloy tube to be welded. An argon input port is arranged on the argon filling box and the top of the argon filling box with the argon spray outlet arranged above the inner side of the weld back. The motor is utilized to rotate the argon filling box around the inner surface of a pipe to be welded. Accordingly, the pipe remains stationary, while the argon filling box and the welding tool rotate simultaneously, in alignment, around the pipe work piece, which is restrained in a fixed position. The alignment and use of such a tool can require substantial set-up and turnaround times.

In view of at least the foregoing references, there is a demonstrable need for an improved localized gas-purge welding device as presently disclosed herein.

BRIEF DESCRIPTION OF THE DRAWINGS

FIG. 5 is a perspective view of an example counterweight of the example gas purge device.

FIG. 6 is a front elevational view of the example counterweight of FIG. 5.

FIG. 7 is a cross-section view of the example counterweight taken along line 7-7 of FIG. 6, and looking in the direction of the arrows.

FIG. 8 is an elevational view of an example pipe fitting for the inlet gas supply used with the example inert gas dispersion unit.

FIG. 9 is an elevational view of an example pipe fitting for an outlet gas supply for use with the example inert gas dispersion unit.

DETAILED DESCRIPTION

Figure 1:
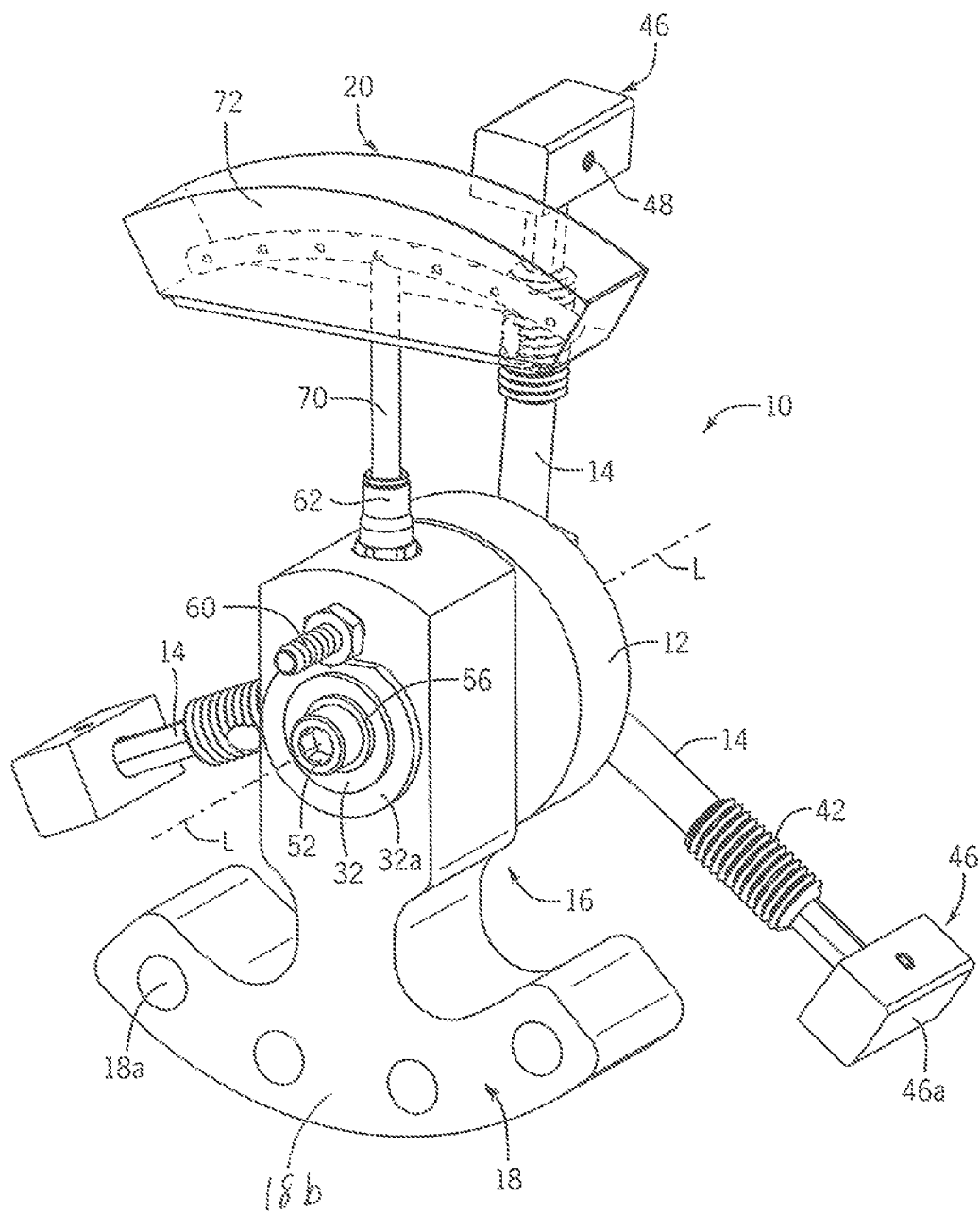
FIG. 1 is a perspective view of an example of a gas purge apparatus in accordance with the present disclosure, showing the inert gas dispersion unit, inert gas entry fitting, counterweight bearing assembly and workpiece stabilizer arms.

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced without these specific details. Thus, while the invention is susceptible to embodiment in many different forms, the subsequent description of the present disclosure should be considered as an exemplification of the principles of the invention.

In general, an instantaneous gas purge tool for use in dynamic welding operations is presently disclosed. The example gas purge tool disclosed herein utilizes a counterbalance weight assembly for maintaining a localized inert gas dispersion unit, and gas dispersion bowl or head, in immediate juxtaposition with a weld area.

More particularly, in certain welding operations, it is necessary and/or desirable to remove oxygen from the welding atmosphere to prevent oxidation of the weld. Historically, as described above, this problem has been solved, in one approach, by using welding machines that incorporate large chambers surrounding the weld site. In operation, any air and gas in those chambers is purged with an inert gas (such as argon), such that the chamber is filled with only the inert gas. Then, the welding can occur in a pure inert gas atmosphere, significantly preventing the oxidation of the weld. Of course, one drawback of this solution is that it requires a significant amount of equipment, including a chamber assembly, as well as expensive inert gases—together with significant costs associated with the time for preparing and evacuating the chamber, including the time and expense for first filling the chamber. Set-up and turnaround times between successive welding operations can be costly.

To address at least some of the drawbacks of the above-referenced devices, the present application discloses a "localized" gas purge tool that can be used instantaneously. For instance, rather than incurring the time and expense of positioning and filling an airtight chamber with inert gas, the device of the present disclosure provides an immediate, localized, continuous flow of inert gas directly fed to the site of the weld, on one side of the seam to be welded, while a conventional gas flow device covers the opposite side of the seam, also immediately adjacent the welding operation. Further, the device of the present disclosure enables a more automated, facilitated welding operation, thereby realizing a significant savings in both preparation and turnaround time, allowing workpieces to be welded more quickly. Likewise, turnaround times for successive welding operations can be dramatically reduced.

Referring to FIG. 1, an example of gas purge apparatus 10 is shown for use inside a cylindrical welding operation. In general, the gas purge apparatus 10 includes central hub 12, a plurality of stabilizer arms 14 extending radially from hub 12, and a gas delivery assembly 16 mounted on hub 12 for independent rotation relative to hub 12, by way of bearing sleeve 32a (also shown in FIG. 3). Gas delivery assembly 16 itself comprises counterweight 18 and gas dispersion unit 20 opposite counterweight 18, which gas dispersion unit is maintained in a position juxtaposed to a welding site, upon rotation of hub 12 and the workpiece 200-201 of FIG. 2. Gas dispersion unit 20 which provides a continuous flow of the inert gas for the welding operation. Due to gravity, counterweight 18 tends to remain stationary during a welding process, thereby continuously maintaining gas dispersion unit 20 in a spatially fixed location, in this example, in an upright position opposite counterweight 18, underneath the stationary weld site as workpiece 200-201 is rotated. It will be appreciated by one of ordinary skill in the art, that during a welding operation, as will be described hereinbelow, a welding device 220 remains stationary opposite gas dispersion unit 20 on the opposite side of desired weld seam 202.

Figure 3:
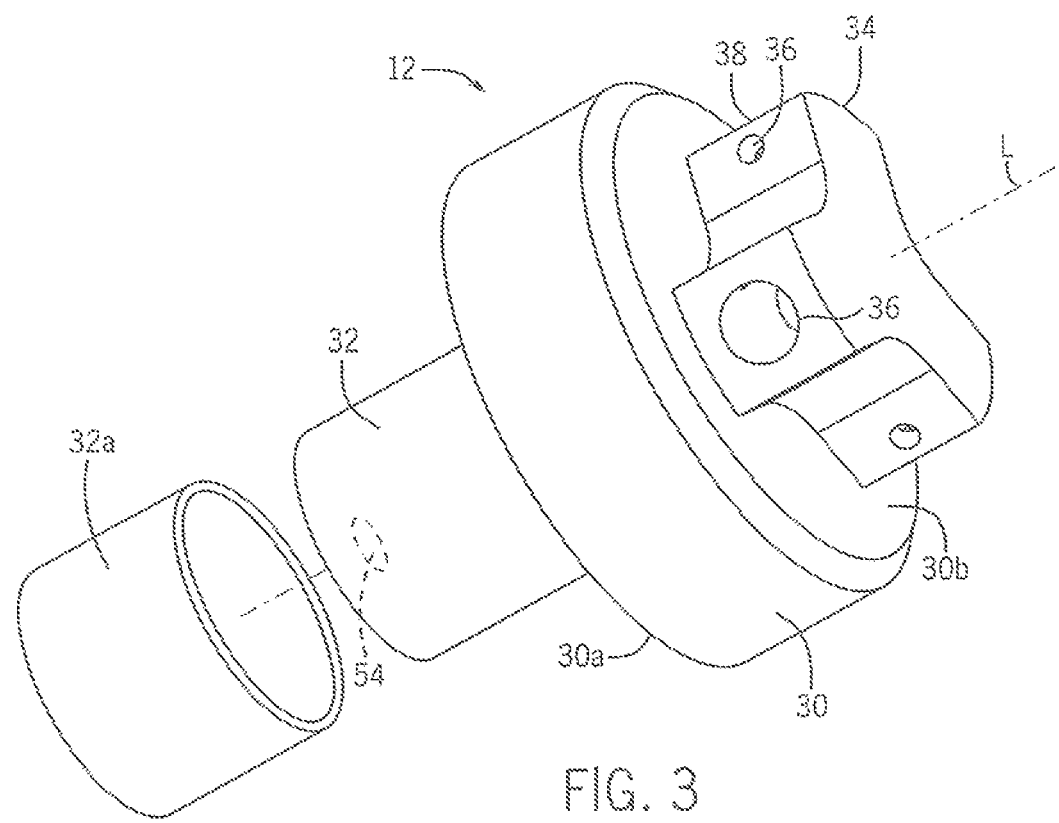
FIG. 3 is a perspective view of a hub and shaft of the example gas purge device.

As illustrated in FIGS. 1 and 3, hub 12 of example gas purge apparatus 10 generally comprises hub body 30 having shaft 32, extending from a first side 30a of hub body 30. Rotatable bearing sleeve 32a is telescopically positioned over shaft 32. In the present example, hub body 30 is generally disc-shaped, and shaft 32 extends along a longitudinal axis L of hub 12. Further, example hub 12 includes mounting block 34 extending from a second side 30b of hub body 30. In this example, mounting block 34 includes a plurality of (e.g. three) radially facing mounting apertures 36 adapted to permanently or removably receive a respective one of stabilizer arms 14, such that stabilizer arms 14 radially extend from hub 12. As noted above, hub 12 is rotatably connected to gas delivery assembly 16, to enable counterweight 18 to maintain gas dispersion unit 20 juxtaposed to a fixed welding site, while hub 12 rotates with workpiece 200-201 during the welding operation. By being independently rotatable from hub 12, gas delivery assembly 16 utilizes gravity to maintain counterweight 18 and gas dispersion unit 20 in their correct, relatively stable, upright positions. Longitudinal axis L is typically a horizontal axis—orthogonal to any gravitational forces.

In this example also, hub 12 is constructed of aluminum, though it will be appreciated by one of ordinary skill in the art that hub 12 may be constructed of any suitable material, including a suitable composite, metallic, and/or non-metallic material as desired. Furthermore, the shape and/or location of the specific components of hub 12 may vary as desired. In the illustrated example, mounting block 34 is configured to receive an end of each respective stabilizer arm 14, and stabilizer arms 14 may be secured within apertures 36 via a fastener, such as a set screw 38, or other suitable fastener (e.g., adhesives, threading, retention rings, pins, etc.). While hub 12 is illustrated as being configured for receipt of three stabilizer arms 14, it will be understood that any number of arms 14 may be utilized. Preferably, hub 12 should be maintained in position in the center of cylindrical workpiece 200-201. Stabilizer arms 14 provide stability, to enable the proper location and rotation of the apparatus within workpiece 200-201, upon rotation.

Figure 4:
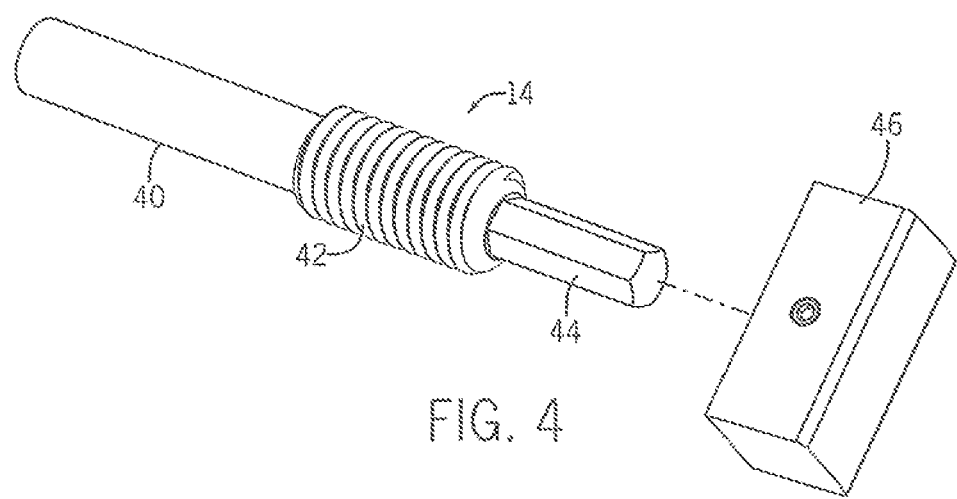
FIG. 4 is a perspective view of an example stabilizer arm component of the example gas purge device of FIG. 1.

As shown in FIG. 4, each of example stabilizer arms 14 comprises a shaft 40 having a spring plunger 42, with a longitudinally adjustable nose 44, which is fixed to workpiece attachment block 46 through, for example, set screw 48. As best seen in FIG. 1, a block 46 may be mounted via fastener 48 to the distal end of each arm 14 to provide a surface for frictional engagement within workpiece 200-201 during use of apparatus 10. Plunger 42 spring-biases nose 44, block 46 and pad 46a radially away from hub 12. Accordingly, it will be appreciated that plunger 42 may be any suitable biasing member including, for example, a coil spring. Further, it will be understood that arm 14 may be unbiased, and rotated incrementally into position, as desired. In addition, each stabilizer arm 14 may be extendible. For example, in addition to any biasing member contained within plunger 42, plunger 42 may also telescopically receive elongated sections of nose 44. In this way, each stabilizer arm can be extended from its initial length to a greater length, to enable gas purge apparatus 10 to be used within cylindrical articles having smaller and larger diameters. As constructed, arm 14 may provide a variable biasing force depending upon the longitudinal location of nose 44. In this case, each of the arms 14 is capable of producing a biasing force of between approximately 4 and 20 lbs. In this example, shaft 40 and nose 44 of arm 14 are each made of a steel material, although it will be understood that any suitable material may be utilized as desired.

Turning now to FIGS. 5-7, counterweight 18 and gas delivery assembly 16 define a gas delivery assembly mounting bore 50 for rotatably mounting gas delivery assembly 16 on shaft 32 of hub 12. Bearing sleeve 32a or other suitable member will allow gas delivery assembly 16 and counterweight 18 to freely rotate on shaft 12. As is illustrated, counterweight 18 includes offset weight portion 18b, whereby gravity will cause offset weight portion 18b to orient counterweight 18 generally downwardly, when the through axis of gas delivery assembly mounting bore 50—earlier described as longitudinal axis L—is horizontal. In at least some instances, the movement of gas delivery assembly 16 and counterweight 18 on hub 12 may be further mechanically arranged to assist in providing for a proper alignment. The actual weight of counterweight 18 is selected to work within the intended parameters. Counterweight 18 must be sufficiently heavy to maintain gas dispersion unit 20 at the vertical apex of gas purge apparatus 10, while counterweight 18 is oriented at the vertical nadir of gas purge apparatus 10. At the same time, counterweight 18 cannot be too heavy, lest its weight create a drag on the rotating workpiece. The desirable weight can be achieved by utilizing weight reduction cavities, such as cavity 18a in counterweight 18. As shown in FIG. 1, gas delivery assembly 16 may be mounted to bearing sleeve 32a of shaft 32 by any suitable retainer, such as for instance, via cap screw 52 and washer 56 threadably secured to a corresponding aperture 54 located in the shaft 32, or simply by way of an interference fit between bearing sleeve 32a and gas delivery assembly mounting bore 50.

As best viewed in FIG. 7, gas delivery assembly 16 includes gas inlet 57 and a radially extending gas outlet 59 fluidly coupled to gas inlet 57. While gas outlet 59 is illustrated as being located immediately over gas delivery assembly aperture 16a, the location of the gas outlet 59 may be varied, including generally horizontal, radially offset, etc.

As will be appreciated by one of ordinary skill in the art, gas delivery assembly 16 remains oriented in its given location, generally upward of offset weight portion 18b, as counterweight 18 remains dispersed at the lowermost portion of the gas delivery assembly during use. Gas entry fitting 60 (FIG. 8) may be mounted to the gas inlet 57 to provide for an attachment point for a gas supply as will be described. Similarly, gas outlet 59 may include a threaded gas outlet fitting 62 (FIG. 9) to provide an attachment point for routing the inert gas to gas dispersion unit 20. To provide corrosion resistance, counterweight 18 may be manufactured from a stainless steel; however, it will be appreciated that counterweight 18 may include any suitable material as desired.

Figure 11:
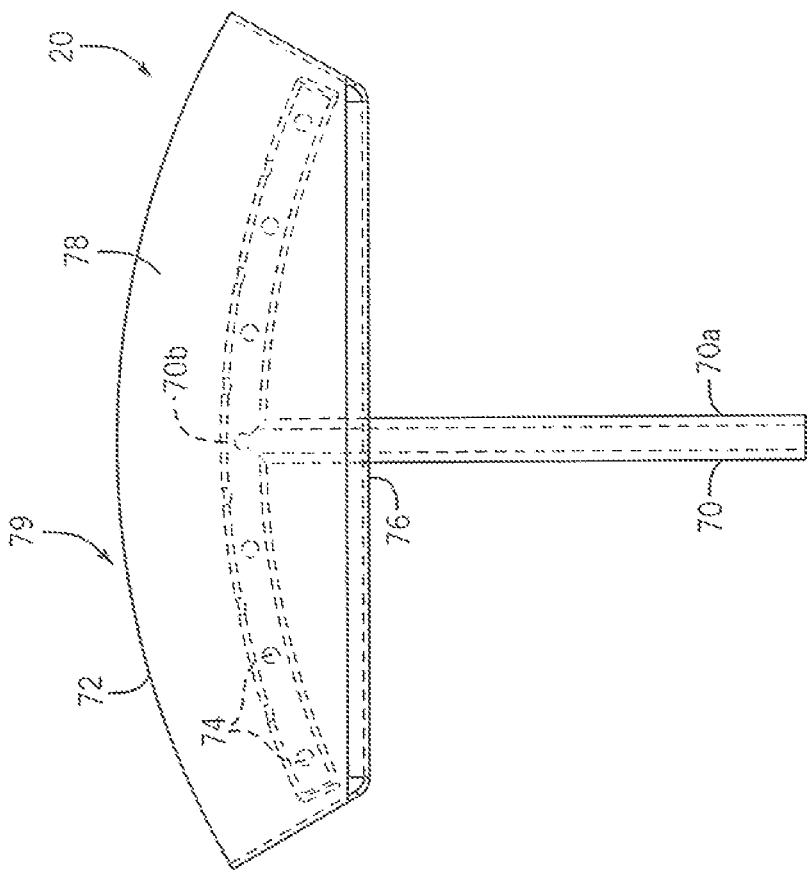
FIG. 11 is a side elevational view, partially in phantom, of the example gas bowl of FIG. 10.
Figure 10:
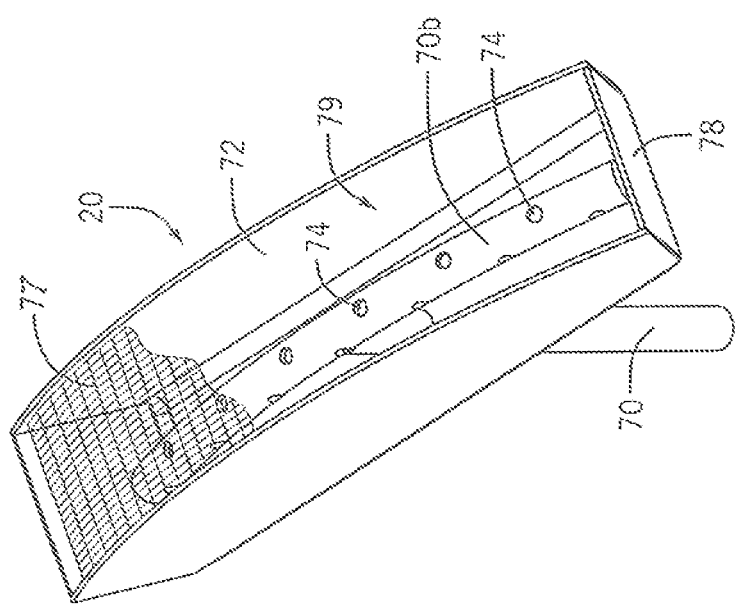
FIG. 10 is a perspective view of the example gas dispersion bowl for use with the example gas purge device of FIG. 1.

As shown in FIGS. 10 and 11, gas dispersion unit 20 includes conduit 70, and gas dispersion container or bowl 72. The example conduit 70 includes a first end 70a, configured to be releasably coupled to the gas outlet fitting 62 and a second dispersion end comprising gas discharge head 70b, which itself comprises at least one gas outlet. In this example, gas discharge head 70b is a generally T-shaped tube comprising a plurality of outlet apertures 74. As with stabilizer arms 14, conduit 70 may be extendible, in which case it would comprise a series of several tubes, each telescopically received within the last. As will be appreciated, the cross portion of the T-shaped gas discharge head 70b may include a curvature or any other shape, as desired—as long as it effectively distributes the inert gas adjacent the welding operation within workpiece 200-201.

The example gas dispersion bowl 72, meanwhile, defines a through-hole 76 to allow tube 70, and more particularly dispersion end 70b, to enter into bowl 72. The retained dispersion end 70b is then at least partially surrounded by a shroud portion 78. The shroud portion 78 defines an open side 79 radially facing outwards. Open side 79 of shroud portion 78 may be sized and shaped to generally correspond to the size and inner shape of the articles being welded (e.g., an eight-inch workpiece, ten-inch workpiece, or any other size). Further, open side 79 of the shroud portion 78 may optionally include a seal or other gasket-type surface to provide for some fluid sealing against the inner surface of the workpiece to be welded. It is possible that open side 79 may be "covered" by a latticework grill 77, partially shown in FIG. 10, which may assist in further distributing the inert gas and for protecting bowl 72. As will be understood, when the inert gas exits outlet apertures 74, bowl 72 will generally maintain the supplied gas within shroud portion 78 of bowl 72, and thus localize the supplied gas adjacent the weld seam location. It will therefore be appreciated that the length and shape of tube 70 as well as the length and shape of bowl 72 may be varied according to the dimensions of the articles being welded. Further, in the present example, tube 70 and bowl 78 are both manufactured from a stainless steel alloy, but it will be understood that any suitable material may be utilized.

Figure 12:
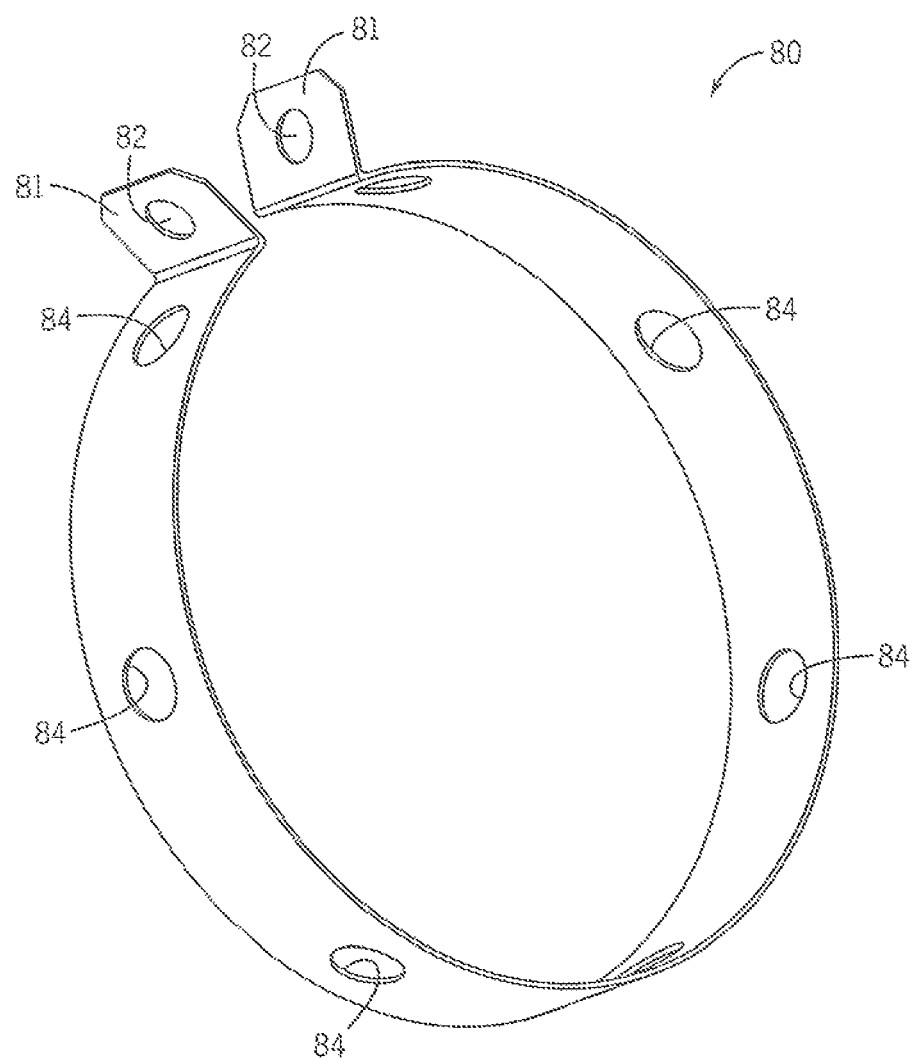
FIG. 12 is a side elevational view of one approach, here, a preliminary clamp fixture, for spot welding the cylindrical portions of a tubular workpiece together for welding.

Prior to the full welding operation, one can preliminarily spot weld or TIG-tack weld workpiece section 200 to workpiece section 201 through various approaches, at regular points along the weld seam, to provide additional stability and to facilitate the welding process. In one embodiment, this can be accomplished by using clamp fixture 80, as shown in FIG. 12. Clamp fixture 80 is placed over and around adjoining workpiece sections 200-201, directly about welding seam 202. Clamp fixture 80 may be temporarily wrapped around welding seam 202, with attachment members 81 being held together, either manually, or by a fastening mechanism inserted through end apertures 82. Clamp fixture 80 comprises several radial apertures 84, which enable a welder to "pre-weld" workpiece sections 200-201 together using conventional spot welding or TIG-tack welding techniques. This action facilitates the complete welding operation by enabling workpieces 200-201 to be capable of rotating in unison as a single workpiece. Alternatively, clamp fixture 80 can be replaced with a conventional slotted hose clamp (not shown), for continuously joining the workpieces 200-201 during the seam welding process.

Figure 2:
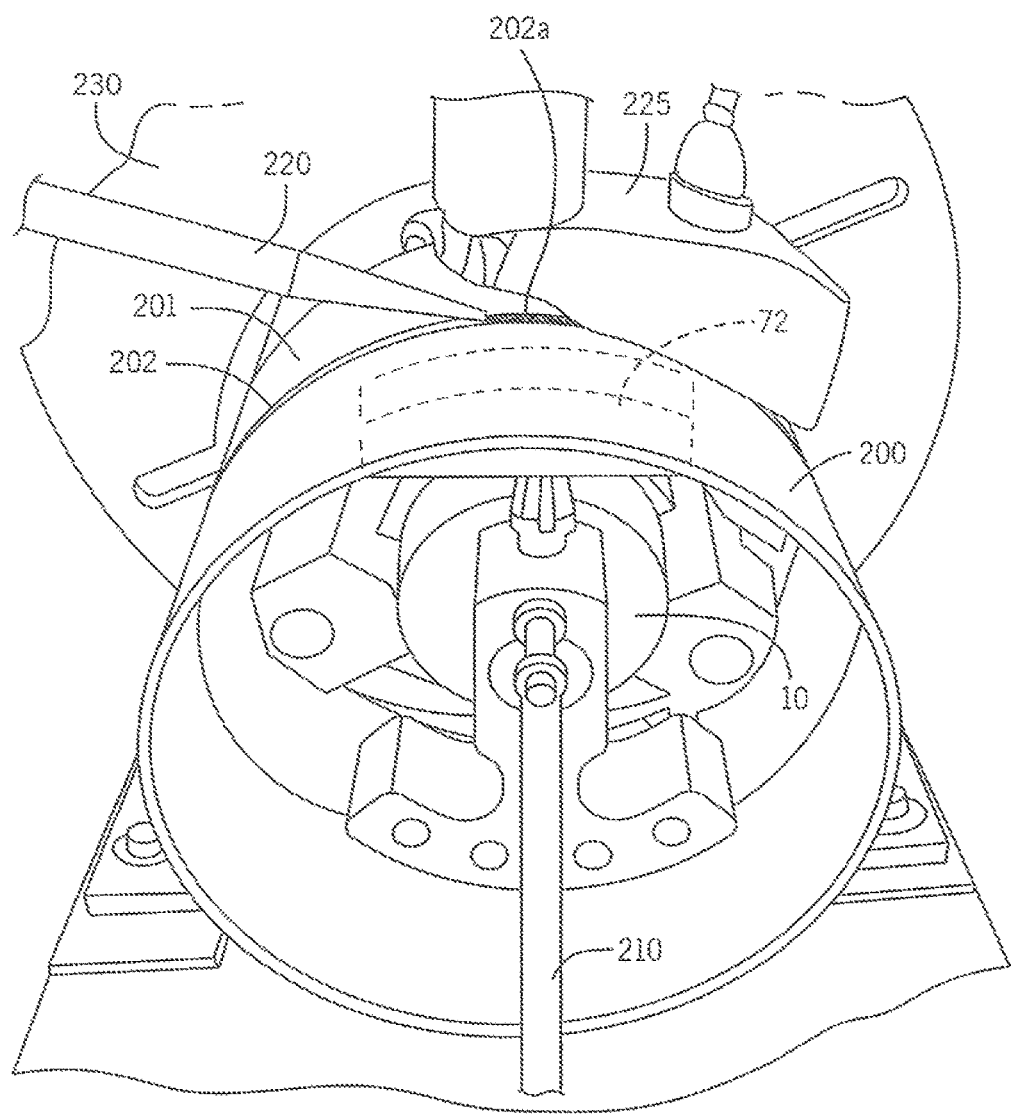
FIG. 2 is a front perspective view of the example gas purge device of FIG. 1 as operably mounted in a tubular workpiece requiring welding about its circumference.

Referring to FIG. 2, in order to prepare for a welding operation, apparatus 10 is inserted into the inner cavity of, for example, workpiece sections 200-201, which are being end-welded along welding seam 202. In particular, apparatus 10 is located within workpiece sections 200-201, such that bowl 72 is proximate the inner surface of the welding location. Apparatus 10 may be secured within one of workpiece sections 200-201, via outward-biasing radial pressure of stabilizer arms 14 against the inner surface of respective workpiece sections 200-201. As noted above, the pressure of stabilizer arm pads 46a against the inner surface of workpiece sections 200-201 will substantially anchor apparatus 10 within workpiece sections 200-201 and prevent relative movement between workpiece sections 200-201 and hub 12, except for free rotation of gas delivery assembly 16. The spot welds at welding seam 202, made using clamp fixture 80, further assist in preventing relative movement between tubes 200-201 and hub 12. Gas supply tube 210 may then be attached to apparatus 10 via inlet pipe fitting 60 to provide the device with a supply of a gas, which in this example is an inert gas, such as argon. It will be appreciated that the supplied gas may be any desired gas according to the requirements of the weld.

Welding device 220, such as an arc welder, is located at the outer side of workpiece sections 200-201 opposite the location of bowl 72, e.g., on the outer side of welding seam 202. An optional outer gas shroud 225 may be located proximate welding device 220 to further provide a supply of gas to the outer surface of welding seam 202 as desired. A rotating device 230, or other suitable device, is coupled to workpiece sections 200-201 to rotate workpiece sections 200-201 about their aligned longitudinal axis.

Once apparatus 10 workpiece sections 200-201 are TIG-tack welded, the welding process can commence. Apparatus 10 is inserted within workpiece sections 200-201, the inert gas is connected to gas delivery assembly 16, and the release of gas is activated. Welding device 220 welds workpiece sections 200-201 along welding seam 202 while workpiece sections 200-201 are rotated, to form, from welding seam 202, a finished, welded seam 202a. In this example, workpiece sections 200-201 are rotated by rotating device 230 at an appropriate speed, but it will be appreciated that workpiece sections 200-201 can be rotated by any suitable means including, for instance, manually. While the welding process is occurring, gas dispersion unit 20 provides a supply of the desired inert gas to bowl 78 and thus to the interior surface of welding seam 202. As a consequence, the welding process can occur in a relatively pure inert gas atmosphere to prevent oxidation of weld seam 202. As noted above, in at least some instances, outer gas shroud 225 may provide a similar or different gas stream to the outer surface of welding seam 202 to further provide the welding process with a relatively pure inert gas atmosphere, as well, to the outside of workpiece sections 200-201.

As described above, as the welding process occurs while workpiece sections 200-201 rotate; gas delivery assembly 16, welding device 220, optional gas shroud 225, and gas dispersion unit 20 are relatively fixed in position. Specifically, under the influence of gravity, counterweight 18 is suspended upon hub 12, which hub 12 rotates along with workpiece sections 200-201, to cause gas dispersion unit 20 to remain relatively upright, or in any other spatially fixed location. As a practical result, apparatus 10 can provide a localized gas environment without any motorized parts within the workpiece being welded. Further, beyond reducing the amount of inert gas required, the use of apparatus 10 substantially reduces the set-up and turnaround times for both singular and successive welding operations The foregoing description and drawings merely explain and illustrate the invention, and the invention is not so limited, as those skilled in the art who have the disclosure before them will be able to make modifications and variations therein without departing from the scope of the invention.

What is claimed is:

1. A gas purge apparatus for distributing inert gas proximate to a preferred weld seam location, to prevent oxidation upon welding two adjoining articles together, said gas purge apparatus comprising:

a hub configured for rotation comprising a hub body, a hub shaft extending from the hub body along a longitudinal axis of the hub, and a plurality of stabilizer arms radially extending from said hub, one or more of said plurality of stabilizer arms being operably associated with a respective engagement member for fastening a distal end of each of said plurality of stabilizer arms to an internal surface of at least one of said two adjoining articles, so as to maintain the hub in an operable attached position within at least one of said two adjoining articles;

a bearing sleeve operably positioned adjacent said hub body, about said hub shaft, a gas delivery assembly positioned immediately about the bearing sleeve and adjacent the hub body to direct inert gas from a position proximate to the bearing sleeve to said preferred weld seam location adjacent the two adjoining articles, the gas delivery assembly and the bearing sleeve being arranged to resist rotation about the hub shaft extending from the hub body, the gas delivery assembly comprising a counterweight on a first side of the gas delivery assembly and a gas dispersion assembly positioned on a second side of the gas delivery assembly, substantially opposite the counterweight, the gas dispersion assembly being configured to direct said inert gas to said preferred weld seam location, said gas dispersion assembly being configured in substantially vertical alignment with said counterweight and said bearing sleeve; and a gas conduit for conducting said inert gas from said gas delivery assembly into said gas dispersion assembly, the gas delivery assembly maintaining said gas dispersion assembly in a relatively fixed, spatial location adjacent said preferred weld seam location, while said plurality of stabilizer arms are simultaneously rotated with said hub by the two adjoining articles.

2. The gas purge apparatus according to claim 1, in which the plurality of stabilizer arms apply a force against an inner surface of at least one of the two adjoining articles, to substantially prevent relative movement between the hub and the two adjoining articles.

3. The gas purge apparatus according to claim 2, in which at least one of the plurality of stabilizer arms is biased radially outwardly to cooperate with its respective engagement member toward affixation to the inner surface of at least one of the two adjoining articles.

4. The gas purge apparatus according to claim 3, in which at least one of the plurality of stabilizer arms is biased radially outwards by a plunger assembly.

5. The gas purge apparatus according to claim 1, in which the respective engagement member on at least one of the plurality of stabilizer arms comprises a biased restraint pad mounted on a distal end of said at least one of the plurality of stabilizer arms, opposite the hub.

6. The gas purge apparatus according to claim 1, in which the gas delivery assembly includes a bearing assembly to independently mount the gas delivery assembly for rotation about the shaft of the hub.

7. The gas purge apparatus according to claim 1, in which the gas conduit extends radially outwardly to a gas discharge head positionable proximate to the preferred weld seam location.

8. The gas purge apparatus according to claim 1, in which the gas delivery assembly further includes a gas feed coupling for introducing gas from a gas source into the gas conduit.

9. The gas purge apparatus according to claim 7, wherein the gas discharge head is generally T-shaped.

10. The gas purge apparatus according to claim 9, wherein a cross portion of the T-shaped gas discharge head includes a curved region.

11. The gas purge apparatus according to claim 7, in which the gas discharge head includes a plurality of gas outlets.

12. The gas purge apparatus according to claim 7, in which said gas dispersion assembly comprises a gas accumulation bowl at least partially surrounding the gas discharge head, said gas accumulation bowl being positionable subadjacent said preferred weld seam location.

13. The gas purge apparatus according to claim 12, in which the gas accumulation bowl comprises a shroud defining an open side facing radially outwardly toward said preferred weld seam location.

14. The gas purge apparatus according to claim 13, in which the shroud is shaped to correspond to a shape of the inner surface of said two adjoining articles, said shroud being positionable beneath the weld seam formed between said two adjoining articles.

15. The gas purge apparatus according to claim 13, in which the shroud includes a grill member to at least partially isolate the open side of the gas accumulation bowl from the inner surface of at least one of the two adjoining articles.

16. The gas purge apparatus according to claim 8, in which the gas purge apparatus further comprises a source of gas for operable attachment to said gas feed coupling.

17. The gas purge apparatus according to claim 16, in which the gas purge apparatus further comprises a welding device located adjacent an outer surface of the two adjoining articles, which outer surface is oriented opposite the gas dispersion assembly, the welding device configured for welding the two adjoining articles.

18. The gas purge apparatus according to claim 17, in which the gas purge apparatus further comprises a second gas dispersion assembly adjacent the outer surface of the two adjoining articles, proximate to said welding device.

19. The gas purge apparatus according to claim 18, in which the gas purge apparatus further comprises a rotating device operably coupled to at least one of the two adjoining articles, said rotating device configured to impart rotation to the two adjoining articles relative to the welding device, during welding at said preferred weld seam location.

20. The gas purge apparatus according to claim 1, in which the hub rotates simultaneously with the two adjoining articles during the welding operation.

21. The gas purge apparatus according to claim 1, in which each of the plurality of stabilizer arms is biased so as to be extendible and length adjustable.

22. A gas purge apparatus for use in an interior of two adjacent cylinders during a welding operation at a top of the two adjacent cylinders, at a position of a welding seam being formed between the two adjacent cylinders, said gas purge apparatus comprising:
a hub comprising a hub body, a hub shaft extending from the hub body along a longitudinal axis of the hub, and a plurality of stabilizer arms radially extending from said hub,
said hub shaft and said plurality of stabilizer arms configured for rotation with and within said two adjacent cylinders about a common longitudinal axis as said two adjacent cylinders are rotated and, in turn, rotate said plurality of stabilizer arms and said hub shaft;
a bearing sleeve positioned about said hub shaft to isolate portions of the gas purge apparatus positioned about said bearing sleeve from rotation as said hub body and said hub shaft rotate together with said two adjacent cylinders;
said isolated portions of the gas purge apparatus including a gas delivery assembly positioned immediately about the bearing sleeve and adjacent the hub body to direct gas from a position proximate the bearing sleeve to said welding seam, the gas delivery assembly and the bearing sleeve being arranged to resist rotation about the hub shaft, the gas delivery assembly comprising a counterweight and a gas dispersion assembly operatively coupled to and spatially fixed relative to the counterweight, the gas dispersion assembly configured to convey an inert gas to a position adjacent at least a portion of the interior of the two adjacent cylinders at a location proximate the welding seam, to displace oxygen during the welding operation for an improved weld,
said counterweight, said gas dispersion assembly and said bearing sleeve positioned in substantially vertical operable alignment with one another about said hub shaft, said gas dispersion assembly remaining in a fixed spatial location proximate to the welding operation at the top of said two adjacent cylinders as the hub and said plurality of stabilizer arms are rotated by said two adjacent cylinders about the common longitudinal axis during said welding operation.

23. The gas purge apparatus according to claim 22, in which the plurality of stabilizer arms exert a force against the interior of at least one of said two adjacent cylinders to substantially prevent relative movement between the hub and said two adjacent cylinders.

24. The gas purge apparatus according to claim 22, in which the gas dispersion assembly includes an inert gas conduit that extends radially outwardly, said inert gas conduit being operably connected to a gas discharge head and having at least one gas outlet configured to discharge the inert gas proximate to the welding seam during the welding operation.

25. The gas purge apparatus according to claim 24, in which the gas discharge head is generally T-shaped.

26. The gas purge apparatus according to claim 24, wherein the gas discharge head includes a plurality of gas outlets.

27. The gas purge apparatus according to claim 24, further comprising a gas accumulation bowl at least partially surrounding the gas discharge head.

28. The gas purge apparatus according to claim 24, in which the gas accumulation bowl comprises a shroud defining an open side facing radially outwardly toward said welding seam.

29. The gas purge apparatus according to claim 28, in which the shroud is shaped to correspond to a shape of the inner surface of said two adjacent cylinders, said shroud being positionable beneath the weld seam formed between said two adjacent cylinders.

30. The gas purge apparatus according to claim 24, in which the shroud includes a grill member to at least partially isolate the open side of the gas accumulation bowl from the inner surface of at least one of the two adjacent cylinders.

31. The gas purge apparatus according to claim 24, in which the gas dispersion assembly is located opposite the counterweight such that the gas dispersion assembly is maintained in a generally upright spatial position opposite the counterweight.

* * * * *